United States Patent [19]

Shekita et al.

[11] Patent Number: 4,776,554
[45] Date of Patent: Oct. 11, 1988

[54] POSITIONING SCHEME FOR MULTIPLE MOUNTING POSITIONS OF INPUT/OUTPUT DEVICES

[75] Inventors: Gregory A. Shekita; Roger C. Williams, both of Raleigh, N.C.

[73] Assignee: International Business Machines Corp., Armonk, N.Y.

[21] Appl. No.: 645,737

[22] Filed: Aug. 30, 1984

[51] Int. Cl.$^4$ ............................................. F16M 1/00
[52] U.S. Cl. ...................................... 248/678; 211/26
[58] Field of Search .................. 248/678, 146; 211/26, 211/13; 108/55.3

[56] References Cited

U.S. PATENT DOCUMENTS

| | | | |
|---|---|---|---|
| 2,064,751 | 12/1936 | Hussman | 248/678 X |
| 3,036,375 | 5/1962 | Schlosser, Jr. et al. | 248/678 X |
| 3,547,274 | 12/1970 | Sosinkski | 211/26 X |
| 3,962,660 | 6/1976 | Duckett | 108/55.3 X |
| 4,203,609 | 5/1980 | Mitchell et al. | 108/55.3 X |
| 4,212,446 | 7/1980 | Domanick et al. | 248/678 |
| 4,516,677 | 5/1985 | Rowland et al. | 108/55.3 X |

Primary Examiner—Ramon S. Britts
Assistant Examiner—Blair M. Johnson
Attorney, Agent, or Firm—Joscelyn G. Cockburn

[57] ABSTRACT

A modular data entry terminal includes a base unit and a plurality of I/O units, (such as a keyboard unit, a printer unit and display unit) which can be assembled to provide an integrated configuration or separated to provide a distributed configuration. The base unit has at least one recessed nesting area with at least one raised island thereon. Each I/O unit is provided with complementary locating devices which mate with the raised island when said unit is seated in the nesting area. The units are held in a positive manner that precludes movements resulting from vibrations (external or internal in the case of printers, etc.) or from bumps associated with normal operation of the units.

Another nesting area is provided for anchoring pedestal-like devices. The terminal is readily converted from an integrated configuration to a distributed configuration by simply removing the I/O units from the base unit and locating them on suitable support surfaces relative to the base unit.

1 Claim, 6 Drawing Sheets

FIG. 5A
FIG. 5B
FIG. 5C
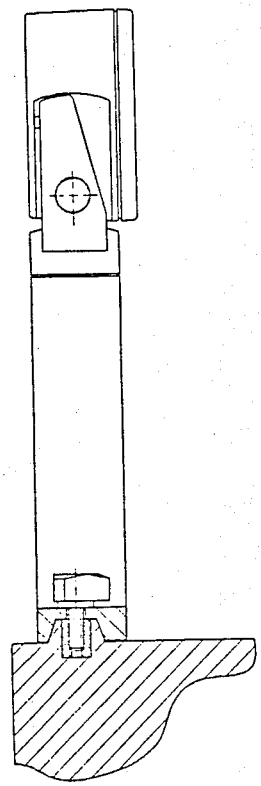
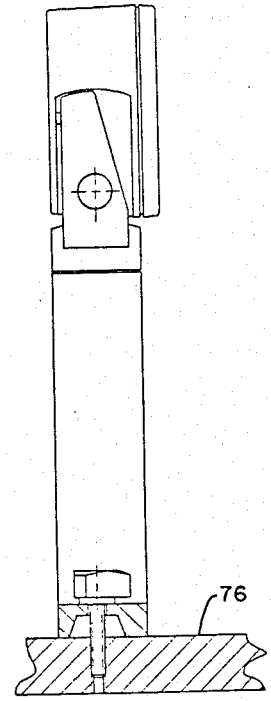
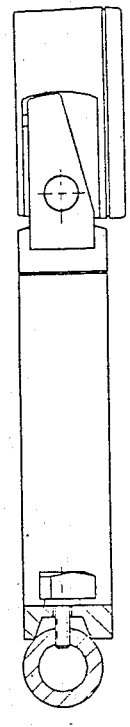

POSITIONING SCHEME FOR MULTIPLE MOUNTING POSITIONS OF INPUT/OUTPUT DEVICES

BACKGROUND OF THE INVENTION

(1) Field of the Invention

The present invention relates to data entry terminals in general and more particularly to point of sale terminals which can be readily converted from an integrated configuration to a distributed configuration and vice versa.

(2) Prior Art

In order to satisfy the different requirements of the market place, data entry terminals are often made available in either a non-modular integrated configuration or a distributed configuration. A non-modular integrated terminal has all of the terminal main components (keyboard, display, printer, electronics, etc.) either in a common housing or at least connected together as one unit. A distributed terminal usually has the components disposed in close proximity to one another, but in a non-cluster configuration. For example, the main electronic unit is located at one place, the keyboard in another place, the display in still another place, and so on.

A customer usually determines his business needs and orders a terminal having the configuration which fits those needs. Generally, the distributed configuration provides the customer the widest range of choices since it can be arranged in the way he feels is most efficient for his particular operation. Of course, if a customer believes that his business needs are best served when all the terminal components are in a stacked arrangement, then that customer would select an integrated terminal configuration over a distributed configuration.

Once the customer elects either an integrated configuration or a distributed configuration, he is stuck with his choice. He cannot readily convert an integrated configuration to a distributed configuration or vice versa. Of course, he may purchase a different configuration to replace the one that no longer suits his needs. However, purchasing a new configuration is not a satisfactory alternative since it increases the cost of doing business to the customer and ultimate consumer. Moreover, the availability of only two configurations which do not allow a customer leeway to reconfigure as his business needs change places an undue restraint on the customer.

Providing two types of terminals (integrated and/or distributed) is also costly and inconvenient for the manufacturers. In the first instance, two different products have to be developed and maintained. Spare parts for both types have to be stocked and service personnel have to be trained to maintain both types of terminals.

Manufacturers have attempted to meet the requirements for both distributed and integrated configurations by providing a partly integrated terminal and a partly distributed terminal. U.S. Pat. No. 4,208,081 is an example of the manufacturer's offerings. In the patent the keyboard can be configured as a standalone unit with a cable connecting it with the other components of the terminal or the keyboard can be nested onto a common housing which supports the other terminal components. In order to provide the standalone or nested configuration, a recess with vertical guides and a protruding electrical connector are placed on the common housing. The keyboard unit has complimentary guides and a connector which mates with the common housing connector when the keyboard unit is slipped into place along the guides.

SUMMARY OF THE INVENTION

It is therefore a main object of the present invention to provide a data entry terminal which can be configured, into an integrated terminal, a partially integrated terminal, a distributed terminal, and a partially distributed terminal, at the user's option.

The versatility is achieved by modularizing the terminal components and providing each component with a latching means which enables it to coact with complementary latching means provided in a nesting area positioned on the main electronic unit. In the distributed configuration the modular components are disposed in proximity with the main electronic unit albeit away from the nesting area.

More particularly, a foot print adapted to nest a plurality of I/O units is fabricated on the base unit (called the boss box) and/or the cash drawer. The base unit or boss box is the component which houses the terminal electronics. The footprint includes two spaced juxtapositional recessed areas. One of the recessed areas is fitted with three upwardly projecting members which are distributed in spaced relationship across the width of the recessed area. Individual devices are provided with complementary locating members which mate with the raised areas and hold the device firmly when the device is positioned in the recess area. By spacing the raised members and the complementary locating members, the device can be positioned to the right, left or center of the recessed area.

The other recessed area is fitted with a centrally located boss which extends upwardly from the recessed area. The bottom surfaces of individual devices are fitted with three complementary locating members positioned in spaced relationship across the width of the device. When the complementary members are mated sequentially with the centrally locating boss, the device can be placed to the right, left or center of the recessed area.

The foot print is further characterized by a raised trapezoidally shaped locating area which mates with an angular recess surface which is disposed on a pedestal-type I/O device.

In one feature of the invention, the recessed area carrying the centrally located boss is fabricated at the front edge of the base unit. The keyboard unit is nested in the recessed area. The recessed area carrying the three raised members carries a printer unit. This recessed area is seated behind the keyboard carrying recessed area. Finally, the raised trapezoidally shaped area carrying a pedestal-like display is disposed at the back edge of the base unit. In the distributed configuration the I/O units are placed away from the base unit and individual cables interconnect each device with the base unit.

The foregoing and other features and advantages of this invention will be more fully described in the accompanying drawings.

BRIEF DESCRIPTION OF THE DRAWINGS

FIGS. 5-5C shows the feature that allows pedestal-type devices to be mounted to the foot print.

DESCRIPTION OF THE PREFERRED EMBODIMENT

Figure 1:
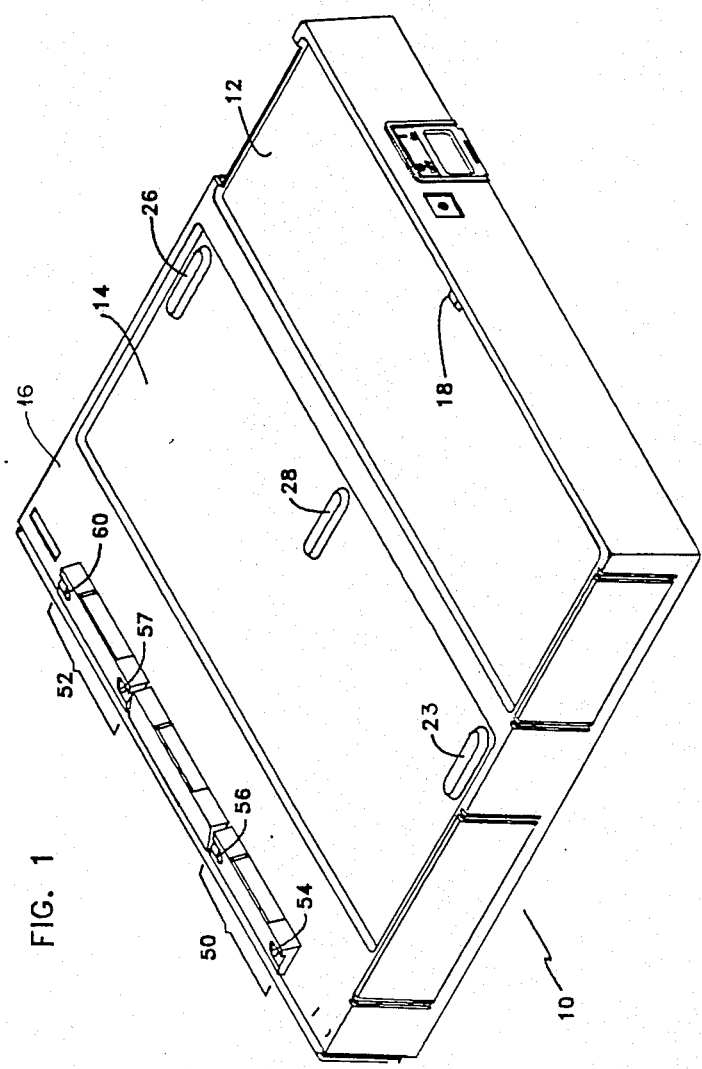
FIG. 1 shows a foot print for positioning modular I/O devices. The foot print and associated devices embody the teaching of the present invention.

FIG. 1 shows a support surface (sometimes called a foot print) for a data entry terminal according to the teachings of the present invention. The support surface is fabricated on the top surface of the control box 10 which houses the electronics for the terminal. Instead of the control box the support surface may be fabricated on top of the cash register housing. The modular I/O devices (to be described hereinafter) can be mounted in the unique nesting areas (to be described subsequently). The control box need not be mounted on top of the cash drawer as is the usual practice but it can be mounted in some other area away from the cash drawer. This configuration tends to reduce the terminal size and decreases the distance between the keyboard I/O devices that require operator's intervention frequently. This ultimate configuration is particularly suited for World Trade countries with legislation governing maximum spacing and sizing of I/O devices.

Still referring to FIG. 1, the unique foot print includes a front nesting area identified by numeral 12, a middle nesting area identified by numeral 14 and a rear nesting area identified by numeral 16. Each one of the nesting areas is designed to interact with I/O devices and hold them firmly when the terminal is configured in an integrated form.

The front nesting area 12 is designed with a recessed area disposed next to the front edge of the control box 10. This nesting area is equipped with central locating boss 18 which extends upwardly from the bottom of the nest area.

Figure 2A:
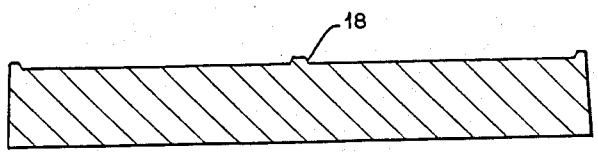
FIGS. 2A-2E show a feature of the invention which provides multiple mounting positions for some types of I/O units.

Turning to FIG. 2A for the moment, a cross section of the front nesting area with the central locating boss is shown. This nesting area is ideal for mounting a keyboard I/O device.

Figure 2B:
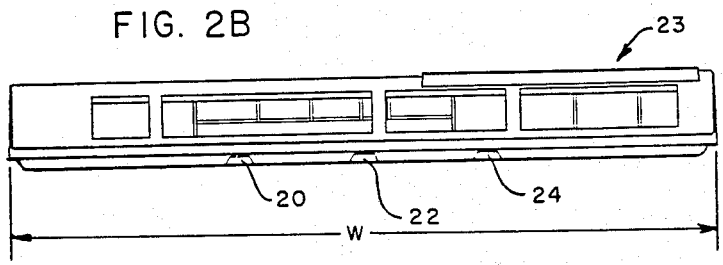
Figure 2C:
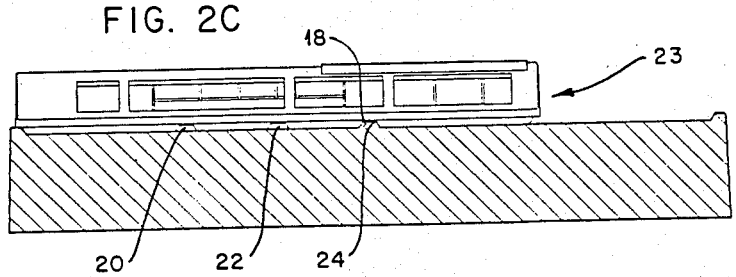
Figure 2D:
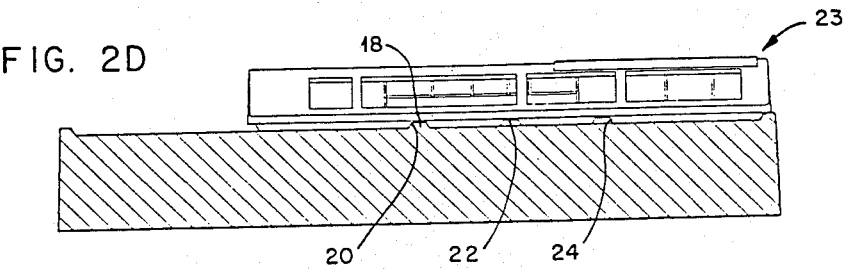
Figure 2E:
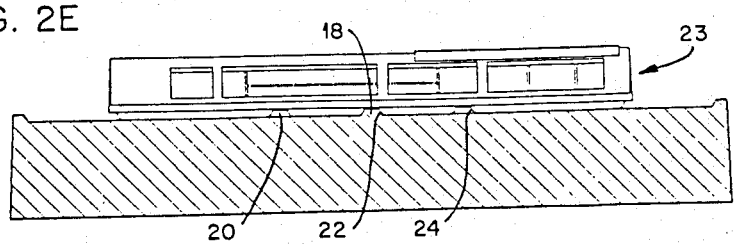

FIGS. 2B-2E show cross sections of the keyboard device interacting with front nesting area 12 (FIG. 1). The bottom surface of the keyboard is designed with three recessed areas or pockets identified by numerals 20, 22 and 24. When the terminal is formed into an integrated configuration, one of the recessed areas mate with the centrally locating boss in the front nesting area. The recesses are arranged in spaced relationship across the bottom surface of the keyboard. Each one of the recessed areas coincides with the locating boss to position the keyboard in one of three positions. With reference to FIGS. 2B-2D, when the left locating pocket 24 coincides with the centrally locating boss, the keyboard is positioned to the left. Likewise, when the right locating pocket 20 coincides with the locating boss, the keyboard is positioned to the right, and when the central locating pocket 22 coincides with the locating boss, the keyboard is positioned at center. Thus by mating one of the recesses with the locating boss the keyboard may be positioned to the right, left or center of the front nesting area. Fore and aft movement of the keyboard is controlled via the front and rear walls of the recessed area. The ability to nest the keyboard positively virtually eliminates random movements of the keyboard due to vibration or normal bumping of the keyboard during use. This security could have been accomplished via positive hold downs (such as screws, clamps, etc.), but the inherent flexibility of positioning of modular elements to suit operator ergonomics would have been severely impaired. Additional flexibility inerrant in this scheme is the ability to mount and position keyboards of virtually any width W (FIG. 2B) provided that the keyboard's width is at least as wide as half of the overall width of the terminal. It should be noted that devices other than keyboards may be nested in the area.

Still referring to FIG. 1, the middle nesting area 14 is recessed with three raised islands identified by numerals 23, 26 and 28. The raised islands extend upwardly from the recessed area and are arranged in spaced alignment across the width of said recessed area. The recessed area provides for positioning one of the various I/O devices in a positive manner and precludes movement resulting from vibrations which may be created from external or internal means. For example, the area may be used to nest an I/O device such as a printer. Such devices are notorious for internally created vibrations. However, because of the positive manner in which the complementary means on the device coacts with the raised islands, any movement in the device (be it externally or internally created) is eliminated. Fore and aft movement of the device is controlled by the front and rear walls of the recessed area.

In the preferred embodiment of the invention the middle nesting area 14 is used to nest I/O devices such as printers which may have variable widths. Of course, devices other than printers may be mounted in this area.

Figure 3:
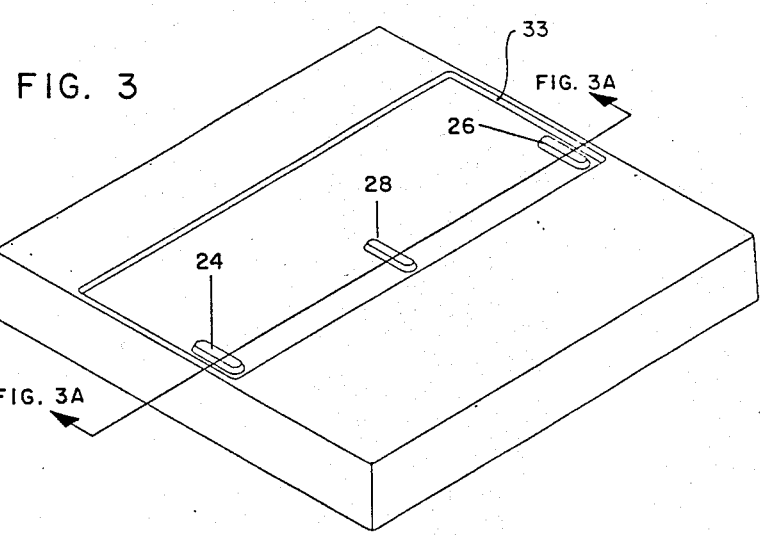
FIGS. 3-3E show the feature of the invention which provides multiple mounting positions for another type of I/O devices.
Figure 3A:
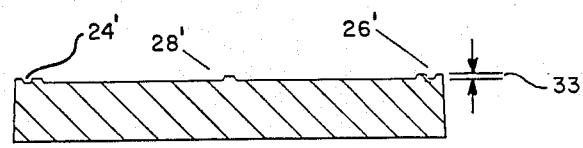

Turning to FIGS. 3 and 3A for the moment, a section taken across the middle nesting area and the raised islands is shown. Raised island 26 coacts with the side of the recessed area 33 to form a right positioning member identified by numeral.32. The right positioning member 26' includes a recessed area disposed between two raised areas. Likewise, raised island 28' provides a center positioning member identified by numeral 28'. Essentially, the center positioning member 28' is a raised area extending upwardly above the bottom of the recess. Finally, raised island 24 coacts with the sides of the recess to form left positioning member 24'. Left positioning member 24' is similar to right positioning member 36' and includes a slot disposed between two raised areas.

Figure 3B:
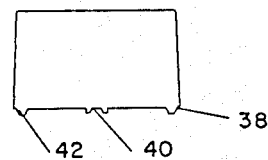

Referring to FIG. 3B for the moment, the bottom surface of the I/O device which is to be mounted in the middle nesting area 14 is fitted with complementary means which enables it to coact with the right positioning member (FIG. 3), the left positioning member and the center positioning member to hold said I/O devices securely in one of three positions. To this end, the under surface of the I/O device is fabricated with a right positioning rail 38, a central positioning member 40 and a left positioning rail 42. The right positioning rail is a protruding member extending from the bottom surface of the I/O unit. The central positioning member includes a central slot disposed between two downwardly extending surfaces. Finally, the left positioning rail 42 is a downward protruding member.

Figure 3C:
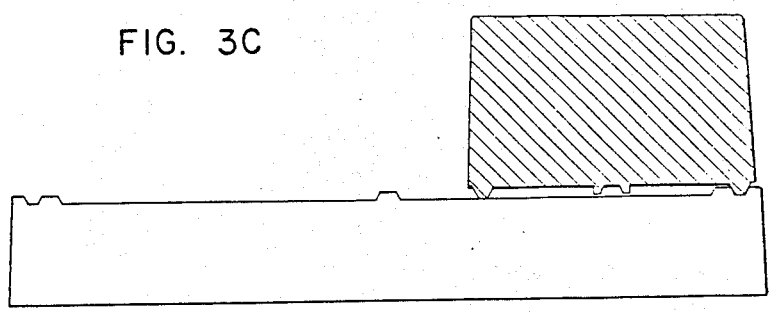
Figure 3D:
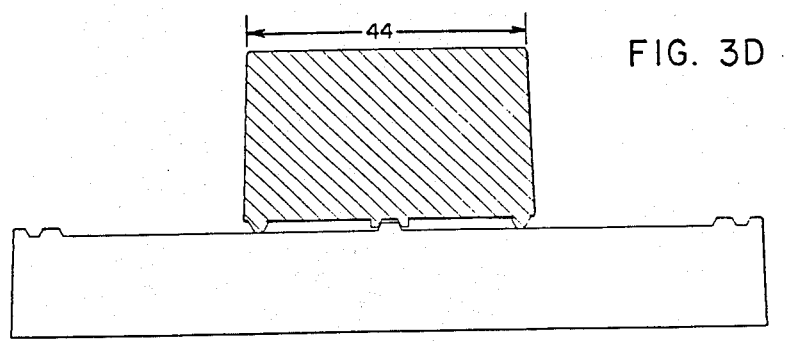
Figure 3E:
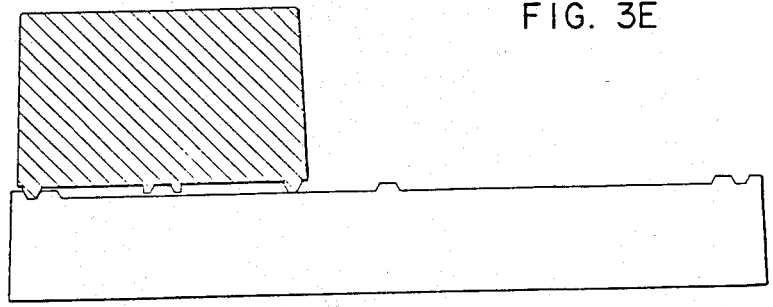

FIGS. 3C-3E show schematics of I/O devices mating with the middle nesting areas to position said devices to the right, center or left. As will be shown subsequently, the positioning of devices is accomplished without regard to the overall width of the device so long as the device is narrower than the overall width of the control box and/or the cash drawer surface on which it is mounted. In FIG. 3C, right positioning rail 38 (FIG. 3B) coacts with right position member 26' (FIG. 3A) to mount the I/O device to the right. Likewise, FIG. 3D shows central positioning member 40 (FIG. 3B) coacting with center positioning member 28' (FIG. 3A) to mount the I/O device at center. Finally, FIG. 3E shows left positioning rail 42 (FIG. 3B) mating with left positioning member 24' (FIG. 3A) to mount the device to the left.

Figure 4A:
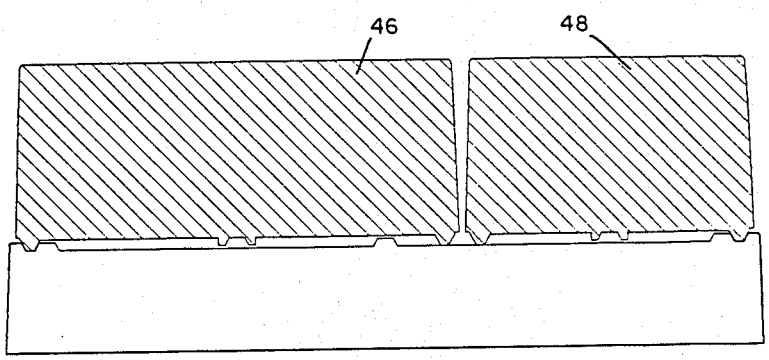
FIGS. 4A-4B show different size devices mounted in a common nesting area.
Figure 4B:
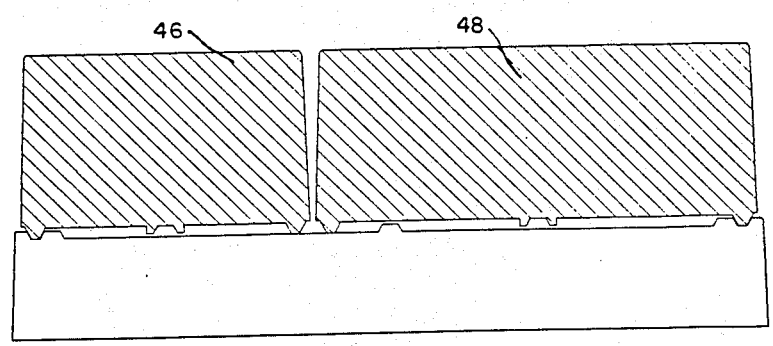

It should be noted that the width of the device can be different without affecting the multi-position mounting characteristic of the present invention. This concept is exemplified by FIGS. 4A and 4B where different size I/O devices 46 and 48 are shown mounted to the same mounting means in middle nesting area 14 (FIG. 1). In addition, the different size devices may be mounted simultaneously in the nesting area. For example, in FIG. 4A a large I/O device is mounted to the left while a small I/O device is mounted to the right. Likewise, in FIG. 4B a small I/O unit is mounted to the left and the large I/O unit is mounted to the right. The flexibility available to a user is enormous. Also, the positive positioning is accomplished without sacrificing ergonomic benefits or modular positioning of devices. Again, positive location of devices could have been accomplished via screws or straps, but ease of use and flexibility would have been impaired. Additional cost for hardware would have incurred, customer setup would have been impaired, and the ability to accommodate follow-on activity severely hampered.

Referring again to FIG. 1, rear nesting area 16 is a raised area which extends upwardly from the top surface of control box 10. In the preferred embodiment of this invention the rear nesting area is fabricated in proximity to the rear edge of the control box. Preferably, it has a trapezoidal shape with two spaced notches defining mounting areas 50 and 52, respectively. Of course, in some devices only a single mounting area is needed and the present invention is intended to cover such a configuration. Furthermore, the mounting areas comprise two pairs of mounting holes identified by numerals 54, 56, 57 and 60, respectively. As will be explained subsequently, these mounting holes accept screws and support a pedestal-like device which can be mounted to the mounting areas when the termainal is configured in an integrated manner.

Figure 5:
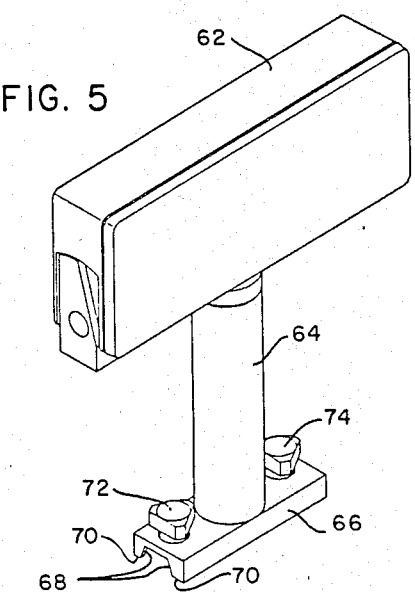

In the preferred embodiment of this invention, the pedestal-like device is a display device shown in FIG. 5. The display device includes a modular display unit identified by numeral 62 and a support assembly comprising of a post 64 connected to the modular display unit and a support base 66 which is an integral part of the post. A compound mounting surface is fitted on the underside of the flat support member 66. The function of the compound surface enables the display unit to be mounted on a variety of different surfaces. To this end, the compound surface comprises of a recessed angular locating mounting surface 68 and flat mounting surfaces 70. Two holes, adapted to receive two 6 mm "threaded" thumb screws 72 and 74, are fabricated on the flat support member of the display. The thumb screw enables the display to be fastened onto the respective mounting surfaces.

Turning to FIGS. 5A-5C for the moment, a side view of the display mounted to different types of surfaces is shown. In FIG. 5A the display is shown mounted to the mounting area 50 and/or 52 (FIG. 1). When the display is mounted to the control box, the terminal is configured in an integrated and/or partially integrated manner and the thumb screw coacts with the mounting holes 54-60 (FIG. 1) to hold the display firmly against the raised areas.

FIG. 5B shows an alternate mounting scheme. In this configuration the same display is mounted on a flat surface 76. In this configuration the display rests on the flat mounting surfaces 70 (FIG. 5) and is not specifically located by the angular locating surfaces.

FIG. 5C shows yet another mounting scheme for the same display unit. In this configuration, the self-centering effect of the post allows the display to be mounted on horizontally oriented tube-like surface, thus increasing customer flexibility in designing in-store mounting fixtures. It should be noted that due to the self-centering action the display need not be mounted vertically as shown, it could be mounted at any angle on the tube. This feature allows for expanded visibility ranges on displays that are mounted on higher than eye level locations. In all of the above schemes the customer is only required to provide a pair of standard 6mm tapped holes to mount the display. Of course, other types of mounting technique can be used without departing from the scope and spirit of the present invention.

While there has been described what is considered to be a preferred embodiment of the invention, variations and modifications therein may occur to those skilled in the art once they become familiar with the basic concept of the invention. Therefore, it is intended thatthe appended claims shall be construed to include both the preferred embodiments and all variations and modifications that fall within the spirit and scope of the invention.

Having thus described our invention, what we claim as new, and desire to secure by Letters Patent is:

1. A data processing terminal support system operable to convert the terminal from an integrated configuration to a distributed configuration, said support system comprising:

a support unit having a foot print thereon and operable for nesting a plurality of different type I/O devices; said foot print including a first elongated recessed area substantially spanning the width of said foot print and having at least one first raised member thereon; said at least one first raised member being operable for mating with complementary means on a first I/O device of said terminal to position said device in an elected one of a plurality of mounting positions;

a second elongated recessed area being fabricated on the support unit and being arranged in juxtaposition with said first elongated recessed area and also substantially spanning the width of said foot print; said second elongated recessed area having a plurality of second raised members being arranged in spaced relationship across the length of the second elongated recessed area and operable for mating with complementary means on a second I/O device of said terminal to lock said device in a selected one of a plurality of mounting positions;

a third raised mounting member being disposed on the foot print outside of the first and second recessed areas and operable for mating with a display having a pedestal with a compound mounting surface being operable to mount the display to the third raised mounting member when said terminal is being arranged in an integrated configuration and to mount said display on different types of surfaces when said terminal is being arranged in a distributed configuration; and a latching means including a pair of thumb screws for fastening the display to said third raised mounting member and a pair of corresponding openings in said third raised mounting member for receipt of said thumb screws to positively mount said display

* * * * *